US006619760B1

United States Patent
Anwar

(10) Patent No.: US 6,619,760 B1
(45) Date of Patent: Sep. 16, 2003

(54) CLOSED-LOOP CONTROL ALGORITHM FOR AN EDDY CURRENT BRAKING SYSTEM

(75) Inventor: Sohel Anwar, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/093,806

(22) Filed: Mar. 7, 2002

(51) Int. Cl.[7] .................. B60T 13/66; B60T 13/68; B60T 13/70; B60T 13/72; B60T 15/14

(52) U.S. Cl. .................. 303/20; 303/124; 188/161; 188/159; 188/267

(58) Field of Search .................. 188/2 A, 267, 188/137, 155, 156, 158, 159, 160, 161, 162; 303/124, 199, 20; 310/74, 93

(56) References Cited

U.S. PATENT DOCUMENTS

| | | | |
|---|---|---|---|
| 3,609,424 A | 9/1971 | Murakami | 310/93 |
| 3,956,722 A | 5/1976 | Lagarde | 335/103 |
| 4,668,886 A | 5/1987 | Marandet et al. | 310/93 |
| 4,717,865 A | 1/1988 | Caputo | 318/362 |
| 4,818,036 A | 4/1989 | Reinecke | 303/50 |
| 4,954,759 A | 9/1990 | Fey | 318/375 |
| 5,170,105 A | 12/1992 | Kumar | 318/362 |
| 5,303,802 A | 4/1994 | Kuwahara | 188/158 |
| 5,337,862 A | 8/1994 | Kuwahara | 188/158 |
| 5,343,134 A | 8/1994 | Wendt et al. | 318/757 |
| 5,418,451 A * | 5/1995 | Maass et al. | 324/158.1 |
| 5,490,584 A * | 2/1996 | Estaque et al. | 188/164 |
| 5,583,406 A | 12/1996 | Mutoh et al. | 318/376 |
| 5,743,599 A | 4/1998 | Henderson et al. | 303/20 |
| 5,821,712 A | 10/1998 | Fittje | 318/376 |
| 5,942,826 A | 8/1999 | Even et al. | 310/105 |
| 5,992,950 A | 11/1999 | Kumar et al. | 303/151 |
| 6,084,325 A * | 7/2000 | Hsu | 310/74 |
| 6,176,355 B1 | 1/2001 | Yamamoto | 188/267 |

FOREIGN PATENT DOCUMENTS

JP     1156000    * 2/1999

OTHER PUBLICATIONS

J. Karl Hedrick, *Analysis and Control of Nonlinear Systems*, Journal of Dynamic Systems, Measurement, and Control (Jun. 1993, vol. 115).

E. Simeu and D. Georges, *Modeling and Control of an Eddy Current Brake*, Control Eng. Practice (vol. 4, No. 1, pp. 19–26, 1996).

Wang et al., *Dynamic Analysis of Eddy Current Braking System Using FEM*, Department of Mechatronics, KJIST, Department of Mechatronics, Changwon University, Korea.

Efe et al., *Establishment of a Sliding Mode In A Nonlinear System By Tuning the Parameters of a Fuzzy Controller*, Bogazici University, Turkey; University of Wyoming, IEEE 2000, pp. 3746–3151.

* cited by examiner

*Primary Examiner*—Christopher P. Schwartz
*Assistant Examiner*—Devon Kramer
(74) *Attorney, Agent, or Firm*—Brinks Hofer Gilson & Lione

(57) ABSTRACT

A method and system for controlling an eddy current braking system in a motor vehicle is provided. The motor vehicle includes a prime mover linked to the eddy current braking system to provide torque thereto, and the eddy current braking system has a retarder assembly including at least a rotor and a stator. The method includes the steps of detecting a feedback current from the retarder assembly, detecting a rotor speed of the rotor, providing a signal indicative of a desired retarding torque, and determining a command current for the retarder as a function of the feedback current, rotor speed and desired retarding torque using a closed-loop sliding-mode control algorithm. The command current is provided to the retarder to control application of torque to the prime mover.

12 Claims, 3 Drawing Sheets

CLOSED-LOOP CONTROL ALGORITHM FOR AN EDDY CURRENT BRAKING SYSTEM

FIELD OF THE INVENTION

The present invention relates to automotive braking systems. In particular, the present invention as disclosed herein relates to an automotive braking system that utilizes an eddy current brake and a control methodology therefor.

BACKGROUND OF THE INVENTION

Electromagnetic retarders or eddy current brakes often have been used to assist in vehicle deceleration, particularly in commercial trucks. In typical prior art eddy current retarders, a brake rotor rotates at the speed of the prime mover until a field coil is energized. Rotation of the rotor is slowed by controlling the current in the field coil. These types of retarders have not found their place in passenger vehicles primarily because they exhibit a lower torque density compared to other friction braking devices. With recent advances in materials and precision air gap retention, it is now possible to obtain significantly higher torque density for eddy current retarders that are configured for improved cooling of the retarder components.

The response characteristics of the new generation of eddy current retarders are relatively rapid compared to other prior art configurations. It is typically desired that the torque response behavior of these devices matches or exceeds the hydraulic friction brake response times. With a conventional PID controller, it is highly unlikely to obtain an improved response behavior without setting the gains too high. High gain settings are undesired because these settings may lead to instability.

Some prior art references address the control strategies for an electromagnetic retarder. U.S. Pat. No. 5,743,599 relates to a control strategy for electromagnetic retarders. The proposed controller includes an open loop that controls the supply current from a current source (battery) to a number of discretely arranged retarder coils. The control system includes a number of switch circuits for energizing or de-energizing the retarder coils.

U.S. Pat. No. 5,187,433 discloses a device for measuring or adjusting braking torques generated by electromagnetic retarders. The device estimates retarder torque via predetermined look-up tables of torque vs. peak voltage between two poles at various rotor speeds.

Simeu & Georges, in 1996, proposed an eddy current brake model as a function of excitation current and rotor speed. However, the disclosed model is more specific to a particular class of eddy current machines. Due to the design of a new generation of eddy current retarders with two to three fold increase in torque density compared to currently available commercial eddy current machines, a more generic control model is desired with the ability to control a range of retarders having various torque density characteristics.

BRIEF SUMMARY OF THE INVENTION

In order to alleviate one or more shortcomings of the prior art, a control method and system are provided herein. In accordance with the present invention, a sliding-mode controller is designed for an eddy current braking system in a vehicle deceleration application.

In one aspect of the current invention, a method for controlling an eddy current braking system in a motor vehicle is provided. The motor vehicle includes a prime mover linked to the eddy current braking system to provide torque thereto, and the eddy current braking system has a retarder assembly including at least a rotor and a stator. The method includes the steps of detecting a feedback current from the retarder assembly, detecting a rotor speed of the rotor, providing a signal indicative of a desired retarding torque, determining a command current for the retarder as a function of the feedback current, rotor speed and desired retarding torque using a closed-loop sliding-mode control algorithm, and providing the command current to the retarder to control application of torque to the prime mover.

In another aspect of the invention, an eddy current braking system for a motor vehicle having a prime mover turning a shaft is described. The system comprises an eddy current brake including a rotor, at least one sensor operably connected to the rotor to detect a rotational speed of the rotor, at least one sensor operably connected to the stator to determine a feedback current of the brake, a computer in communication with the sensors, a torque selector in communication with the computer for selecting a desired retarding torque, and a memory accessible to the computer. The memory stores an algorithm for the computer to determine a command current Icmd as a function of the feedback current, rotor speed and desired retarding torque.

In yet another aspect of the invention, a method for controlling an eddy current braking system in a motor vehicle is provided. The method includes the steps of providing rotor speed and feedback current information to a computer from the eddy current brake, verifying that the rotor speed is above a minimum value, calculating a command current as a function of the rotor speed, feedback current, and desired torque, converting the command current into a pulse-width modulated signal, and providing the signal to the eddy current brake stator.

Simulation results show that the controller herein exhibits clear advantages over the more conventional PID controller. The algorithm and associated implementations disclosed herein exhibit improved robustness and computational efficiency in the controller. The closed-loop control system alleviates the need for an inefficient look-up table which in the past was required to calculate the current command for the brake.

BRIEF DESCRIPTION OF SEVERAL VIEWS OF THE DRAWINGS

FIG. 1b is a side cutaway view of the eddy current brake shown in FIG. 1a;

DETAILED DESCRIPTION OF THE PREFERRED EMBODIMENTS

The present embodiments of the invention implement a sliding-mode controller scheme. A sliding-mode controller scheme may be more appropriate for a range of torque applications in an eddy current brake. Such a controller exhibits high gain characteristics that do not tend to lead to instability as in the prior art.

Figure 1A:
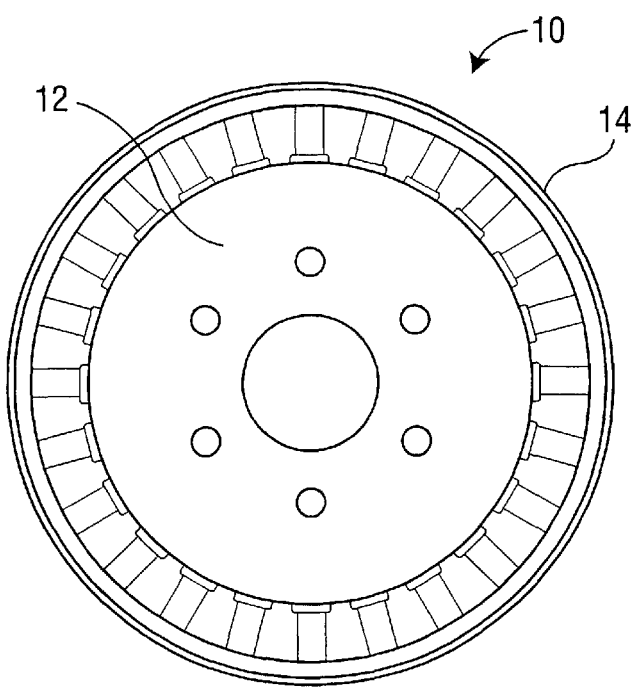
FIG. 1a is a front view of an exemplary eddy current brake that may be implemented the preferred embodiments herein.
Figure 1B:
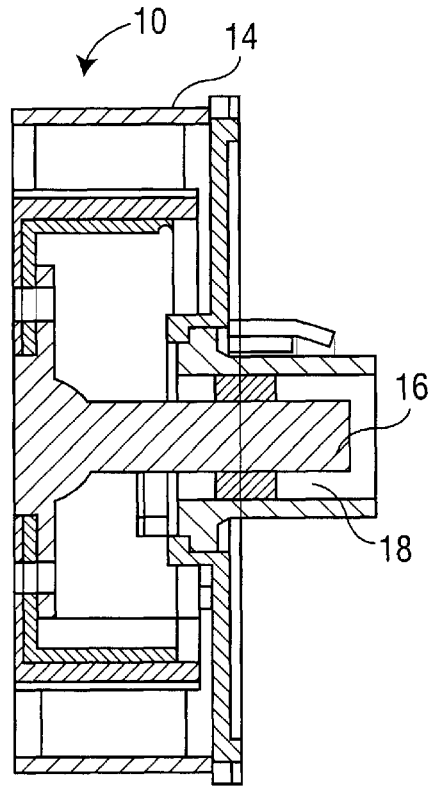

An exemplary eddy current brake or retarder that can be implemented in the present embodiment of the invention is shown in the side views of FIGS. 1a and 1b. The configuration as shown, or other similar eddy current brake units known in the art, may be implemented in conjunction with the present invention.

In the front plan view of FIG. 1a, eddy current brake 10 is shown wherein the rotor 12 is visible. The rotor 12 typically consists of a notched steel or steel with copper impregnated disk that is rotatable through the field of an electromagnet by a prime mover. As shown additionally in FIG. 1b, the rotor 12 is preferably shielded annularly by a housing 14, and is mounted for rotational movement relative to the housing 14 via a shaft 16. The housing 14 is fixedly linked to a stator assembly 18, including a plurality of coils (not shown) that surround at least a portion of the rotor 12 and shaft 16 to form magnetic poles. The poles form an air gap 20 within which the rotor 12 is free to rotate.

Current running through the coils of the stator 18 produces a magnetic flux surrounding the rotor 12. Rotation of the rotor 12 produces a density difference in the magnetic flux, and eddy current is generated at the stator 18. A current may be applied to the stator 18 to apply an electromagnetic torque to the rotor 12 and thereby slow rotation of the rotor 12 relative to the stator in accordance with Maxwell's law. Thus, as the rotor 12 is turned by a prime mover such as an automotive engine or transmission, braking torque may be applied to the rotor—and thus the prime mover—via the stator current. The retarding energy is dissipated as heat through the eddy current flow in the core.

The torque characteristics of the eddy current retarder may be summarized by the following algebraic model:

$$T(t) = f_0(\omega) + f_1(\omega)^* i + f^{2\,(\omega)^*} i^2 \qquad (1)$$

where
T=retarding torque
i=retarder feedback current $$f_i(\omega) = a_{i0} + a_{i1}\omega + a_{i2}\omega^2$$

$a_{i0}$, $a_{i1}$, $a_{i2}$=identified parameters
$\omega$=rotor speed

It is important to note, however, that a dynamic relationship exists between commanded current and the feedback current from the retarder. The following first order differential equation describes the current response characteristics of the retarder:

$$\frac{L}{R}\frac{di}{dt} + i = I_{cmd} \qquad (2)$$

where
L=total inductance of the field winding
R=total resistance of the field winding i=feedback current
$I_{cmd}$=Current command A suitable controller is needed to optimize the retarder response characteristics. Since the eddy current machines in this implementation are being used in a safety critical application such as vehicle braking, it is very important to ensure the fastest retarder torque response. Hence a closed-loop controller is highly desirable. A conventional closed-loop controller such as a prior art PID controller can be designed for this purpose. However, the PID gains are normally tuned to provide fast response without exciting the system unstable modes. For this very reason, the response characteristics can only be quasi-optimized.

A sliding-mode type control algorithm, as implemented below, will tend to stabilize the closed-loop system even when the system unstable modes are excited. Another characteristic of sliding-mode control is the speed of control input application. This high-gain aspect of sliding-mode control allows it to be suitable for the current application. A sliding-mode control algorithm in accordance with the present invention may thus be derived below.

Let the sliding surface be defined as follows:

$$S = (T_{des} - T) \qquad (3)$$

where, $T_{des}$ is the desired retarder torque and T is the estimated wheel torque according to equation (1).

$$\dot{S} = (\dot{T}_{des} - \dot{T}) \qquad (4)$$

$$\dot{T} = \dot{\omega}\left(\frac{df_0}{d\omega} + \frac{df_1}{d\omega}i + \frac{df_2}{d\omega}i^2\right) + (f_1(\omega) + 2f_2(\omega)i)\frac{di}{dt} \qquad (5)$$

According to reference (Hedrick, 1993), a sliding-mode controller can be obtained using the following equation:

$$\dot{S} = -\eta SAT\left(\frac{S}{\phi}\right) \qquad (6)$$

It can be shown that the above control law will drive the system dynamics toward the sliding surface at the convergence rate of $\eta$ within the boundary layer of thickness $\phi$ and will provide a switching control beyond the boundary layer. By selecting a suitable value of $\eta$ and $\phi$, it is possible to achieve desired response characteristics.

Substituting the expression for S and derivative of S in the above equation, the following is obtained:

$$\dot{T}_{des} - \left[\dot{\omega}\left(\frac{df_0}{d\omega} + \frac{df_1}{d\omega}i + \frac{df_2}{d\omega}i^2\right) + (f_1(\omega) + 2f_2(\omega)i)\frac{di}{dt}\right] = \qquad (7)$$
$$-\eta SAT\left[\frac{1}{\phi}\{T_{des} - (f_0(\omega) + f_1(\omega)^* i + f_2(\omega)^* i^2)\}\right]$$

Substituting equation (2) in the above and solving for Icmd, the following control law is obtained:

$$\left[\dot{T}_{des} - \left\{\dot{\omega}\left(\frac{df_0}{d\omega} + \frac{df_1}{d\omega}i + \frac{df_2}{d\omega}i^2\right) + (f_1(\omega) + 2f_2(\omega)i)(I_{cmd} - i)\frac{R}{L}\right\}\right] = \qquad (8)$$
$$-\eta SAT\left[\frac{1}{\phi}\{T_{des} - (f_0(\omega) + f_1(\omega)^* i + f_2(\omega)^* i^2)\}\right]$$

-continued $$I_{cmd} = \frac{L}{(f_1(\omega) + 2f_2(\omega)i)R} \left[ \begin{array}{c} \dot{T}_{des} - \dot{\omega}\left(\frac{df_0}{d\omega} + \frac{df_1}{d\omega}i + \frac{df_2}{d\omega}i^2\right) + (f_1(\omega) + 2f_2(\omega)i)\frac{R}{L}i + \\ \eta SAT\left\{\frac{1}{\phi}(T_{des} - (f_0(\omega) + f_1(\omega)^*i + f_2(\omega)^*i^2))\right\} \end{array} \right] \quad (9)$$

Some exception handling of the above control law (9) must be performed in the control software in the event that the denominator of the RHS is singular. This is discussed further below in conjunction with the implementation of the control.

As implemented in the embodiments herein, the control input to the retarder is preferably current, normally in the form of a pulse-width modulated (PWM) signal. The feedback information required from the retarder are the feedback current and the rotor speed. Also, a desired retarding torque should be provided to the controller. As described above, $f(\omega)$ and the coefficient $a_0$, $a_1$, $a_2$ are known or estimated through a system identification algorithm. $\eta$ and $\eta$ are controller parameters which are to be tuned for optimal performance. The following flow diagram briefly describes the control algorithm.

In a discrete time implementation, the derivative terms in equation (9) can be approximated as follows:

$$\frac{dY}{dt} = \frac{Y(k) - Y(k-1)}{\Delta t}$$

OR $$\frac{df_i}{d\omega} = \frac{f_i(\omega(k)) - f_i(\omega(k-1))}{\omega(k) - \omega(k-1)}$$

Figure 2:
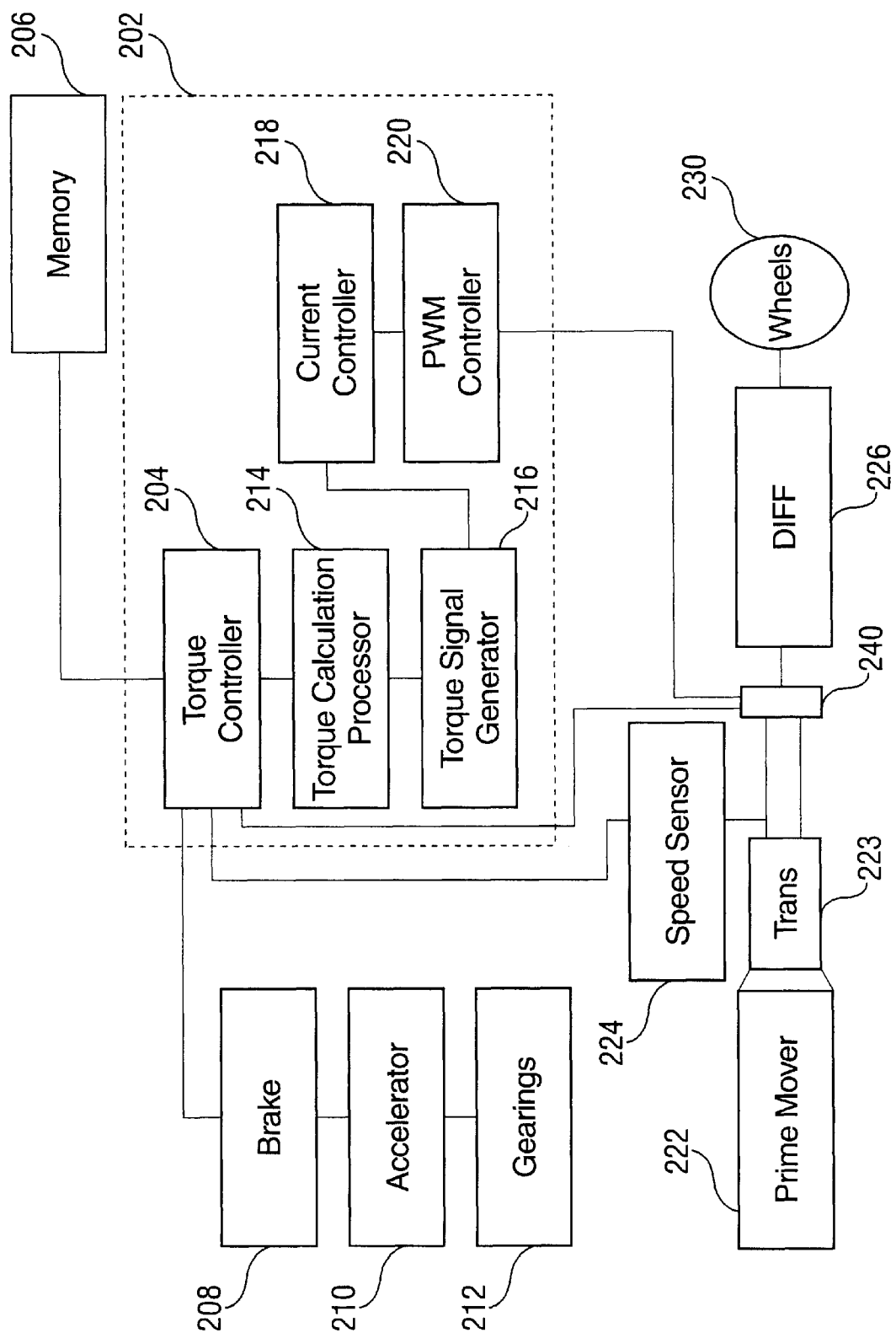
FIG. 2 is a schematic block diagram illustrating an eddy current braking system in accordance with a first embodiment of the present invention.

System Description:

A preferred embodiment of an eddy current braking control system implementing the control strategy above is shown in the schematic block diagram of FIG. 2. As shown in the Figure, a prime mover such as the automobile engine 222 is linked in turn to a transmission 223. The shaft turned by the transmission 223 is linked to an eddy current brake 240 of a configuration that may be similar to that described previously. The eddy current brake 240 is linked to a differential, which is typically linked in turn to one or more wheels 230 in the automobile.

The main processing steps for determining retarding torque application are preferably performed by modules within the microprocessor or computer 202. The main calculation steps for the algorithm are preferably performed within the torque calculation processor 214 using process steps stored in the memory 206. The torque controller 204 receives control information from torque selectors such as the brake 208, accelerator 210, gearing sensors 212 or other torque selection devices such as manual switches or other controllers. Information is also drawn in the form of feedback of rotor speed from the rotor speed sensor 224 and feedback current from the eddy current brake 240. The controller 204 preferably determines when torque calculation is appropriate, and relevant information from the controller 204 may in turn be sent to the torque calculation processor 214.

The torque calculation processor 214 preferably performs the calculation steps of equation (9) above, incorporating the predetermined parameters from the torque controller 204 and some pre-determined constants stored in the memory 206. Once a value of $I_{cmd}$ is determined within the torque calculation processor 214, that value is fed to the torque signal generator 216. The generator 216 preferably converts the signal to a usable current which is in turn sent to a current controller 218. The controller 218 works in conjunction with the PWM controller 220 to generate a pulse-width modulated signal. The signal may in turn be sent to the stator of the eddy current brake 240 to control the torque applied to the shaft of the prime mover 222 or wheels 230.

Figure 3:
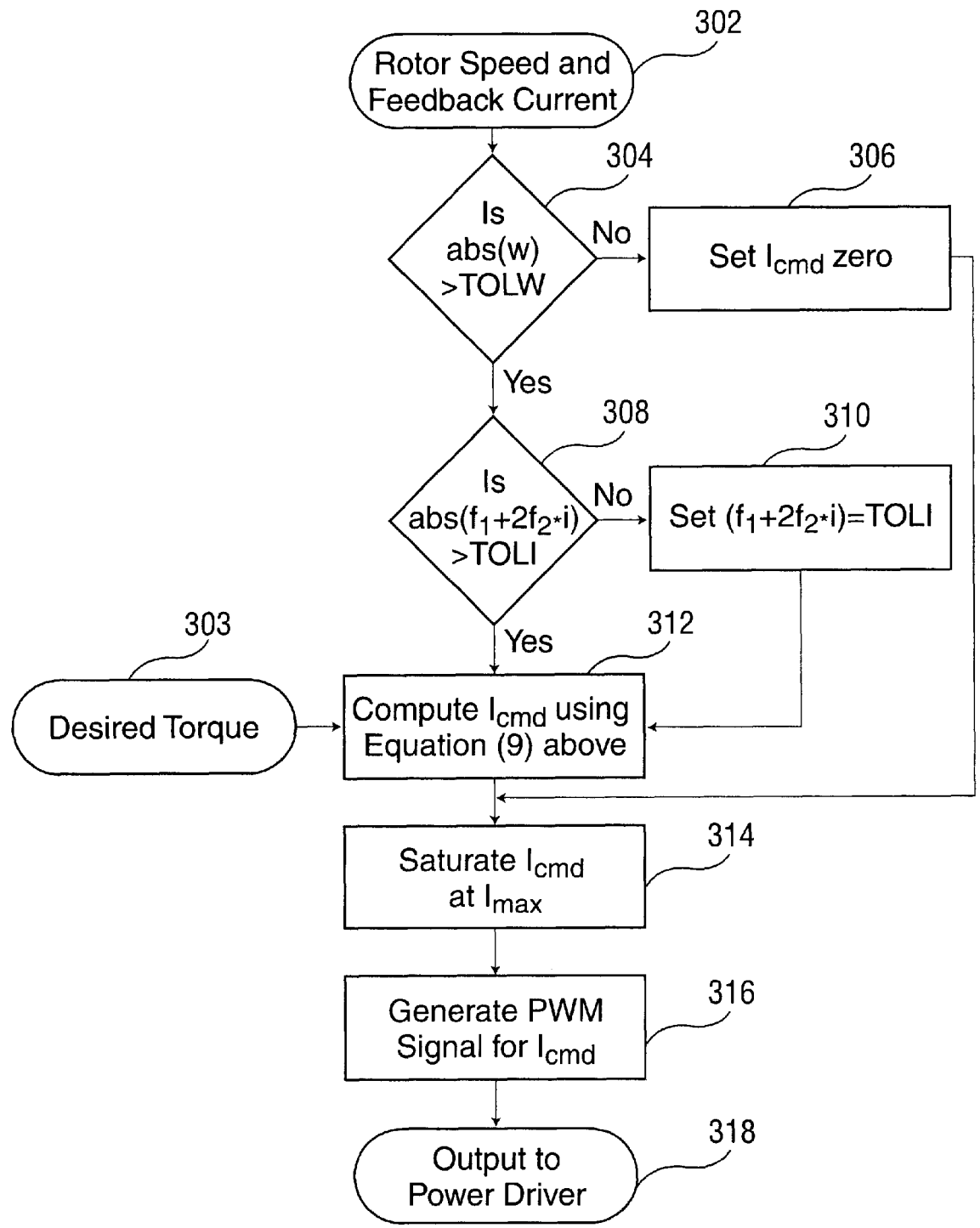
FIG. 3 is a flow diagram illustrating a preferred embodiment of a control scheme an eddy current braking system in accordance with another embodiment of the present invention.

The controller of the preferred embodiment discussed above may be implemented into a microprocessor or similar device known in the art. Other configurations, of course, are possible. A preferred implementation of the controller steps performed by such a device is shown in the flow diagram of FIG. 3.

As shown in the flow diagram, the control input information from the retarder of the eddy current brake is in the form of the rotor speed and feedback current 302 and the desired torque 303 from the torque selector described previously. The rotor speed and feedback current inputs at 302 are first reviewed at 304 and 308. At 304, the absolute value of the rotor speed is checked against a constant TOLW for a minimum rotor speed. Preferably, TOLW is chosen as a minimum rotor speed below which the command current should be set to zero. The minimum rotor speed preferably characterizes the speed below which the eddy current brake loses effectiveness for the particular application. The value may be specific to the particular eddy current brake machine chosen for use in the preferred embodiment. If the detected rotor speed from 302 is not greater than TOLW at 304, then the command current is set to zero at 306.

If the rotor speed is above the minimum, the functional determinants of the equation (9) above are checked against a pre-determined constant TOLI at step 308. This prevents a divide-by-zero condition wherein a zero value is prevented from being set in the denominator of equation (9). This step is performed for safety reasons in connection with the calculation of the equation. If the absolute value of $(f_1 + 2f_2{}^*i)$ is not greater than the chosen value for TOLI, $(f_1 + 2f_2{}^*i)$ is set equal to TOLI at step 310.

After the divide-by-zero check, $I_{cmd}$ is computed in the microprocessor using equation (9) discussed above. The desired torque from 303 is input into the equation along with the rotor speed and feedback current from step 302. The calculated or reset value of $I_{cmd}$ is then saturated at Imax at step 314, and a PWM signal is produced for $I_{cmd}$ at step 316, preferably in a PWM generator. Finally, the value for $I_{cmd}$ is sent as a PWM signal back to the eddy current brake stator at 318.

As noted above, the present method may be implemented in a microprocessor, such as typical processors manufactured by Motorola or Texas Instruments. Other microprocessors or devices, such as software-implemented EPROMs, may also be utilized as is known in the art.

The algorithm and associated implementations disclosed herein exhibit improved robustness and computational efficiency in the controller. The controller maintains stability while driving the system dynamics onto the sliding surface. The algorithm as implemented and disclosed herein also exhibits a faster response time due to high speed switching characteristics of the controller. The closed-loop system alleviates the need for an inefficient look-up table which in the past was required to calculate the current command for the brake.

Furthermore, only a one time system identification of the retarder is needed. Computational efficiency is also improved because the only feedback required for the present algorithm is information on feedback current and rotor speed. Torque feedback information, which often requires further calculations and computing resources, is not required in the algorithm disclosed herein.

It should be noted that there could be a wide range of changes made to the present invention without departing from its scope. Thus, it is intended that the foregoing detailed description be regarded as illustrative rather than limiting and that it be understood that it is the following claims, including all equivalents, which are intended to define the scope of the invention.

What is claimed is:

1. A method for controlling an eddy current braking system in a motor vehicle, said motor vehicle having a prime mover linked to said eddy current braking system to provide torque thereto, and said eddy current braking system having a retarder assembly including at least a rotor and a stator, said method comprising the steps of:

detecting a feedback current from said retarder assembly;

detecting a rotor speed of said rotor;

providing a signal indicative of a desired retarding torque;

determining a command current for said retarder as a function of said feedback current, rotor speed and desired retarding torque using a closed-loop sliding-mode control algorithm; and providing said command current to said retarder to control application of torque to said prime mover.

2. The method of claim 1 wherein said sliding-mode control algorithm further implements a pre-determined convergence rate of $\eta$ within the boundary layer of thickness $\phi$.

3. The method of claim 2 wherein said algorithm further comprises:

$$I_{cmd} = \frac{L}{(f_1(\omega) + 2f_2(\omega)i)R} \left[ \begin{array}{c} \dot{T}_{des} - \dot{\omega}\left(\frac{df_0}{d\omega} + \frac{df_1}{d\omega}i + \frac{df_2}{d\omega}i^2\right) + (f_1(\omega) + 2f_2(\omega)i)\frac{R}{L}i + \\ \eta SAT\left\{\frac{1}{\phi}(T_{des} - (f_0(\omega) + f_1(\omega)^*i + f_2(\omega)^*i^2))\right\} \end{array} \right]$$

wherein $I_{cmd}$ is said command current, L is a coil winding inductance of said stator, R is a coil winding resistance of said stator, $\omega$ is said rotary speed, $T_{des}$ is said desired retarding torque and i is said feedback current.

4. An eddy current braking system for a motor vehicle having a prime mover turning a shaft, said system comprising:

an eddy current brake including a rotor, a stator and a command current input, said rotor operably connected to said shaft;

at least one sensor operably connected to said rotor to detect a rotational speed of said rotor;

at least one sensor operably connected to said stator to determine a feedback current of said brake;

a computer in communication with said sensors;

a torque selector in communication with said computer for selecting a desired retarding torque; and a memory accessible to said computer;

wherein said memory stores an algorithm for said computer to determine a command current $I_{cmd}$ as a function of said feedback current, rotor speed and desired retarding torque.

5. The system of claim 4 wherein said algorithm further comprises a closed-loop sliding-mode control algorithm.

6. The system of claim 5 wherein said sliding-mode control algorithm further implements a pre-determined convergence rate of $\eta$ within the boundary layer of thickness $\phi$.

7. The system of claim 6 wherein said algorithm further comprises:

$$I_{cmd} = \frac{L}{(f_1(\omega) + 2f_2(\omega)i)R} \left[ \begin{array}{c} \dot{T}_{des} - \dot{\omega}\left(\frac{df_0}{d\omega} + \frac{df_1}{d\omega}i + \frac{df_2}{d\omega}i^2\right) + (f_1(\omega) + 2f_2(\omega)i)\frac{R}{L}i + \\ \eta SAT\left\{\frac{1}{\phi}(T_{des} - (f_0(\omega) + f_1(\omega)^*i + f_2(\omega)^*i^2))\right\} \end{array} \right]$$

wherein $I_{cmd}$ is said command current, L is a coil winding inductance of said stator, R is a coil winding resistance of said stator, $\phi$ is said rotary speed, $T_{des}$ is said desired retarding torque and i is said feedback current.

8. The system of claim 7 wherein the predetermined convergence rate within the boundary layer thickness further comprise values selected for maximum braking performance.

9. The control system of claim 8, further comprising a digital signal processor connected between the sensors and the computer, wherein the digital signal processor receives outputs from the sensors, processes the outputs, and sends the outputs to the computer.

10. A method for controlling an eddy current braking system in a motor vehicle, said motor vehicle having a prime mover linked to said eddy current braking system to provide torque thereto, and said eddy current braking system having a retarder assembly including at least a rotor and a stator, said method comprising the steps of:

providing rotor speed and feedback current information to a computer;

verifying that said rotor speed is above a minimum value;

calculating a command current as a function of said rotor speed, feedback current, and desired torque;

converting the command current into a pulse-width modulated signal; and providing said signal to said eddy current brake stator.

11. The method of claim 10 wherein said step of calculating a command current further comprises-applying said rotor speed, feedback current and desired torque to the following algorithm:

$$I_{cmd} = \frac{L}{(f_1(\omega) + 2f_2(\omega)i)R} \left[ \begin{array}{c} \dot{T}_{des} - \dot{\omega}\left(\frac{df_0}{d\omega} + \frac{df_1}{d\omega}i + \frac{df_2}{d\omega}i^2\right) + (f_1(\omega) + 2f_2(\omega)i)\frac{R}{L}i + \\ \eta SAT\left\{\frac{1}{\phi}(T_{des} - (f_0(\omega) + f_1(\omega)^*i + f_2(\omega)^*i^2))\right\} \end{array} \right]$$

wherein $I_{cmd}$ is said command current, L is a coil winding inductance of said stator, $\eta$ is a selected convergence rate, $\phi$ is a selected boundary layer thickness, R is a coil winding resistance of said stator, $\omega$ is said rotary speed, $T_{des}$ is said desired retarding torque and i is said feedback current.

12. An eddy current braking system for a motor vehicle having a prime mover turning a shaft linked to said eddy current braking system to provide torque thereto, and said eddy current braking system having a retarder assembly including at least a rotor and a stator, said system comprising:

means for detecting a feedback current from said retarder assembly;

means for detecting a rotor speed of said rotor;

means for providing a signal indicative of a desired retarding torque;

means for determining a command current for said retarder as a function of said feedback current, rotor speed and desired retarding torque using a closed-loop sliding-mode control algorithm; and means for providing said command current to said retarder to control application of torque to said prime mover.

* * * * *